United States Patent
Standke et al.

(10) Patent No.: US 10,122,182 B2
(45) Date of Patent: Nov. 6, 2018

(54) MULTI-TURN COIL ON METAL BACKPLATE

(71) Applicant: QUALCOMM Incorporated, San Diego, CA (US)

(72) Inventors: Randy Standke, San Diego, CA (US); Chih-Hsiang Ko, San Diego, CA (US); Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/854,303

(22) Filed: Sep. 15, 2015

(65) Prior Publication Data

US 2016/0254678 A1 Sep. 1, 2016

Related U.S. Application Data

(60) Provisional application No. 62/126,013, filed on Feb. 27, 2015.

(51) Int. Cl.
*H04M 3/24* (2006.01)
*H02J 5/00* (2016.01)
(Continued)

(52) U.S. Cl.
CPC .......... *H02J 5/005* (2013.01); *H01F 27/2804* (2013.01); *H01F 27/365* (2013.01);
(Continued)

(58) Field of Classification Search
CPC .. H02J 5/005; H02J 50/80; H02J 50/12; H02J 50/27; H01F 27/2804; H01F 27/365;
(Continued)

(56) References Cited

U.S. PATENT DOCUMENTS

2009/0098827 A1    4/2009  Koyama
2010/0295505 A1*  11/2010  Jung ................... H01M 2/1022
                                                        320/108
(Continued)

FOREIGN PATENT DOCUMENTS

CN    203326731 U    12/2013
CN    203536995 U     4/2014
EP      2648274 A1   10/2013

OTHER PUBLICATIONS

International Search Report and Written Opinion—PCT/US2016/014975—ISA/EPO—dated Sep. 12, 2016—13 pgs.
(Continued)

*Primary Examiner* — Keith Fang
(74) *Attorney, Agent, or Firm* — Hunter Clark PLLC

(57) ABSTRACT

Disclosed is a wireless power transfer apparatus that includes a case for an electronic device. The case may have an electrically conductive panel portion and side portions defined along sides of the panel portion. The case further have at least one opening formed one of the side portions. A coil configured to couple to an externally generated magnetic field may have first segments that span a width of the panel portion of the case and second segments arranged along the side portions of the case and exposed through the at least one opening.

31 Claims, 13 Drawing Sheets

(51) Int. Cl.
*H01F 27/28* (2006.01)
*H01F 38/14* (2006.01)
*H02J 7/00* (2006.01)
*H04B 5/00* (2006.01)
*H04M 1/02* (2006.01)
*H02J 50/12* (2016.01)
*H02J 50/27* (2016.01)
*H01F 27/36* (2006.01)
*H02J 50/80* (2016.01)
*H01Q 7/00* (2006.01)

(52) U.S. Cl.
CPC ............. *H01F 38/14* (2013.01); *H01Q 7/00* (2013.01); *H02J 7/0042* (2013.01); *H02J 50/12* (2016.02); *H02J 50/27* (2016.02); *H02J 50/80* (2016.02); *H04B 5/0037* (2013.01); *H04B 5/0075* (2013.01); *H04M 1/026* (2013.01)

(58) Field of Classification Search
CPC ........ H01F 38/14; H01Q 7/00; H04B 5/0037; H04B 5/0075; H04M 1/026
See application file for complete search history.

(56) References Cited

U.S. PATENT DOCUMENTS

| | | | |
|---|---|---|---|
| 2010/0315389 A1 | 12/2010 | Sorrell et al. | |
| 2011/0050164 A1* | 3/2011 | Partovi | H01F 5/003 320/108 |
| 2011/0130102 A1 | 6/2011 | Nishizono et al. | |
| 2012/0274271 A1 | 11/2012 | Thompson et al. | |
| 2013/0137369 A1* | 5/2013 | Akita | H04B 5/0031 455/41.1 |
| 2013/0257367 A1 | 10/2013 | Someya | |
| 2014/0247188 A1* | 9/2014 | Nakano | H01Q 1/243 343/702 |
| 2014/0378192 A1* | 12/2014 | Wang | H04B 1/3888 455/575.8 |
| 2015/0024811 A1 | 1/2015 | Yoon et al. | |
| 2015/0053773 A1* | 2/2015 | Hsu | G06K 7/10356 235/492 |
| 2015/0087243 A1* | 3/2015 | Murayama | G06K 19/07749 455/73 |

OTHER PUBLICATIONS

International Preliminary Report on Patentability—PCT/US2016/014975—European Patent Office—Munich, Germany—dated Feb. 14, 2017—18 pgs.

* cited by examiner

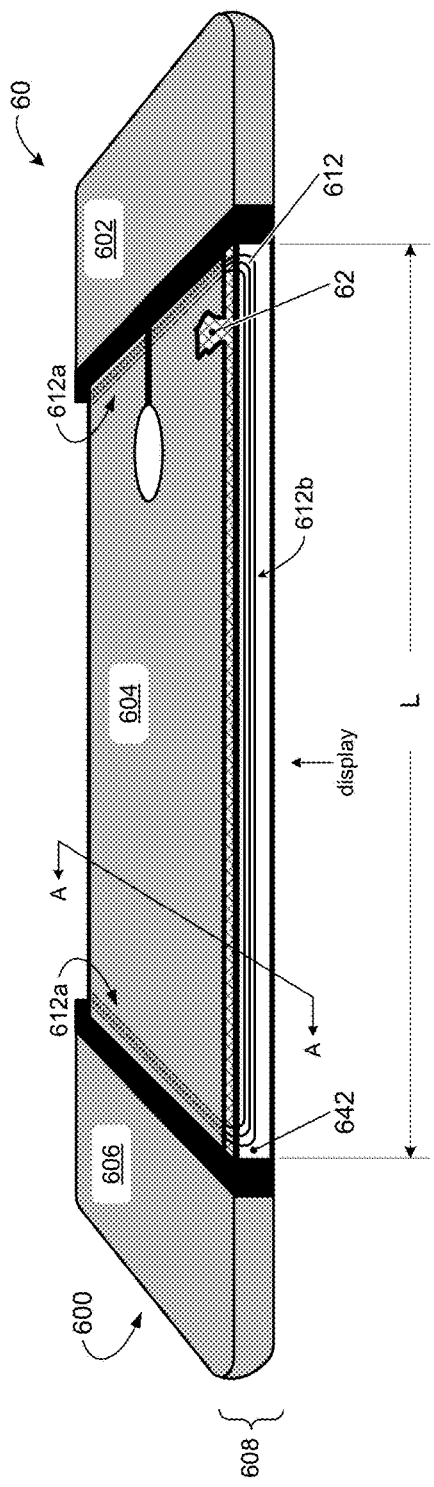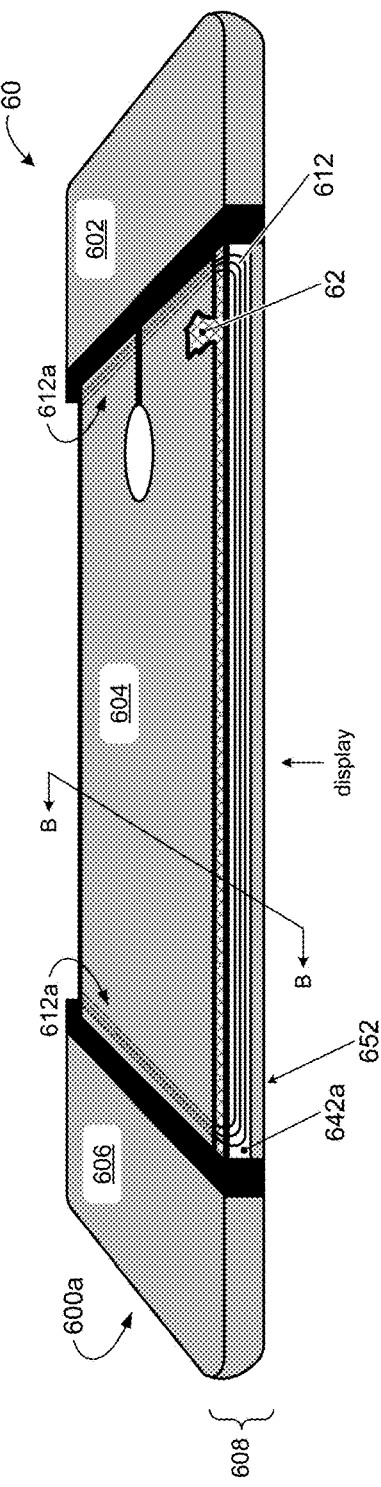

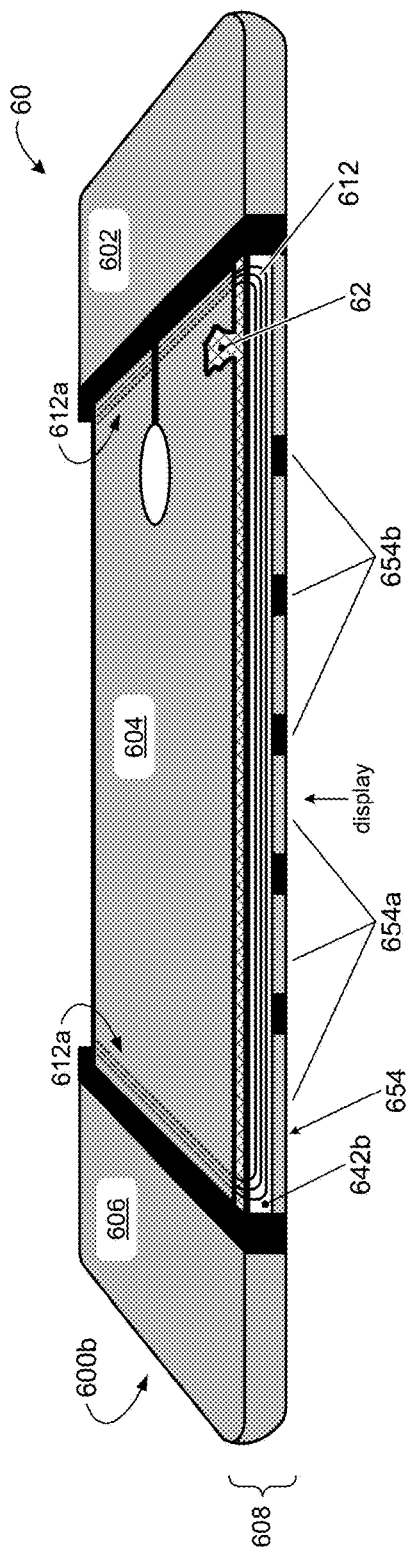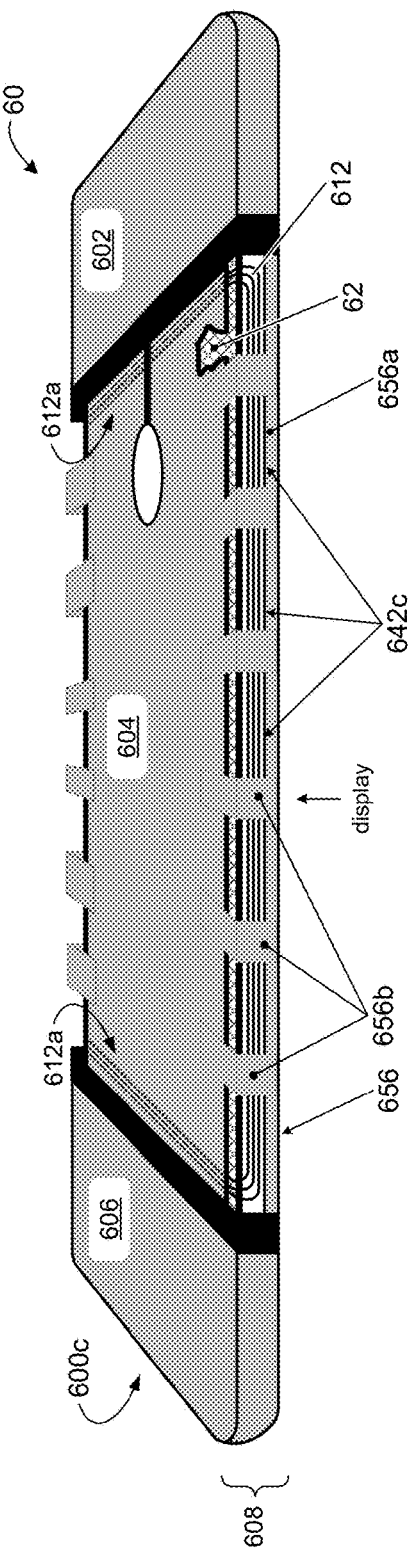

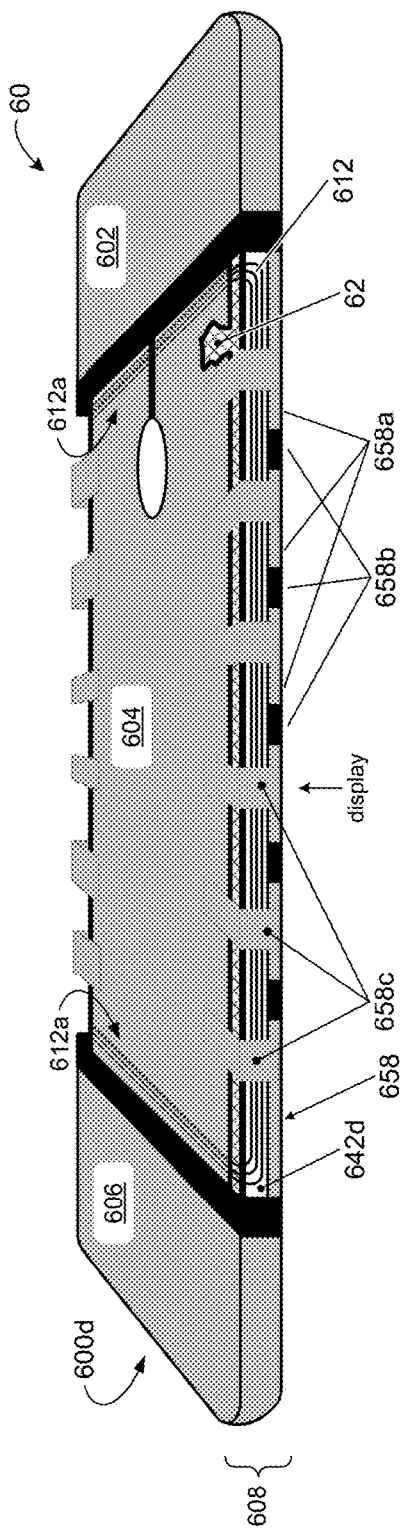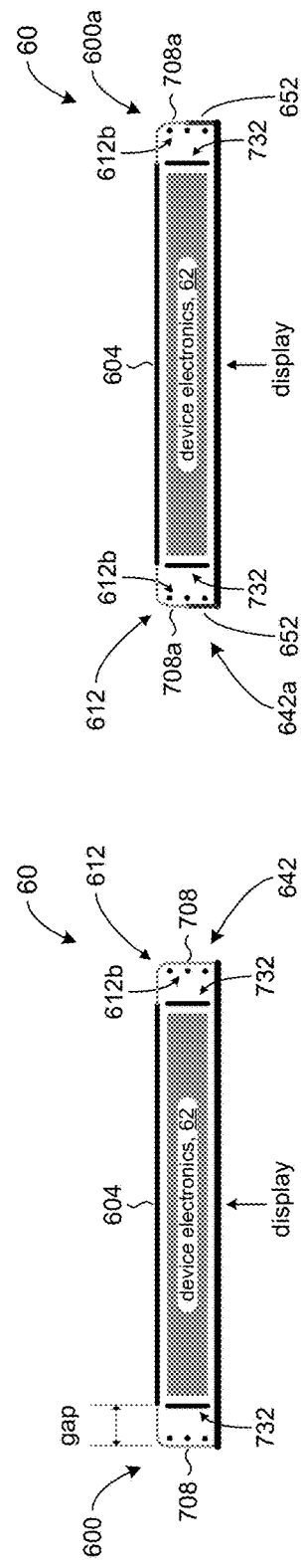

MULTI-TURN COIL ON METAL BACKPLATE

CROSS REFERENCE TO RELATED APPLICATIONS

Pursuant to 35 U.S.C. § 119(e), this application is entitled to and claims the benefit of the filing date of U.S. Provisional App. No. 62/126,013 filed Feb. 27, 2015, the content of which is incorporated herein by reference in its entirety for all purposes.

TECHNICAL FIELD

The present disclosure relates generally to wireless power transfer, and more particularly to coil designs for wireless power reception.

BACKGROUND

Wireless power transfer is an increasingly popular capability in portable electronic devices, such as mobile phones, computer tablets, etc. because such devices typically require long battery life and low battery weight. The ability to power an electronic device without the use of wires provides a convenient solution for users of portable electronic devices. Wireless power charging systems, for example, may allow users to charge and/or power electronic devices without physical, electrical connections, thus reducing the number of components required for operation of the electronic devices and simplifying the use of the electronic device.

Wireless power transfer allows manufacturers to develop creative solutions to problems due to having limited power sources in consumer electronic devices. Wireless power transfer may reduce overall cost (for both the user and the manufacturer) because conventional charging hardware such as power adapters and charging chords can be eliminated. There is flexibility in having different coil sizes and shapes on the transmitter and/or the receiver in terms of industrial design and support for a wide range of devices, from mobile handheld devices to computer laptops.

SUMMARY

The present disclosure describes an apparatus for wireless power transfer. The apparatus may include a case to house electronic components of an electronic device. The case may have an electrically conductive panel portion and side portions defined along sides of the panel portion. The case may have at least one opening formed at one of the side portions. A coil configured to couple to an externally generated magnetic field may have first segments that span a width of the panel portion of the case and second segments arranged along the side portions of the case and exposed to the externally generated magnetic field through the at least one opening.

In some examples, the apparatus may further include a resonant circuit that includes the coil. The coil may be configured to provide power received from the externally generated magnetic field to the electronic components.

In some examples the apparatus may further include ferrite material disposed between a portion of the coil and electronic components spanned by the portion of the coil.

In some examples, the panel portion may include a central opening, and the coil may be disposed in the central opening. In some examples, the panel portion may comprise a first panel portion that has the central opening, and a second panel portion disposed in the central opening. The coil may be disposed in a slot defined between the first panel portion and the second panel portion.

In some examples, the first segments of the coil may be enclosed by the panel portion of the case.

In some examples, the second segments of the coil may be magnetically exposed through the at least one opening.

In some examples, the coil may be electrically separate from the panel portion.

In some examples, the panel portion of the case may be metallic.

In some examples, the case may further comprise an upper panel portion and a lower panel portion.

In some examples, the panel portion may include a slot that extends from an interior of the panel portion to a periphery of the panel portion.

In some examples, the first segments of the coil may be disposed on a printed circuit board (PCB) housed within the case.

In some examples, the side portions of the case may comprise one or more strips of material that comprises the case. The one or more strips of material may be disposed parallel to the at least one opening.

In some examples, the coil may comprise a multi-turn winding of electrically conductive material.

In some examples, the coil may comprise a multi-turn winding of electrically conductive material having a first plurality of turns wound about a circumference of the panel portion of the case and a second plurality of turns wound within the periphery of the panel portion.

The present disclosure describes a method for wireless power transfer to electronic components of an electronic device that includes coupling power from an externally generated magnetic field to a first segment of a coil through a case that houses the electronic components. The method includes coupling power from the externally generated magnetic field to a second segment of the coil through an opening formed through the case at a side portion of the case through which the second segment of the coil is exposed to the externally generated magnetic field. The method includes providing the power to the electronic components.

In some examples, coupling power from an externally generated magnetic field to the second segment of the coil may include coupling to the externally generated magnetic field through a cap that covers the opening formed through the case at the side portion of the case. In some examples, the cap is a non-metallic and non-ferromagnetic material.

In some examples, coupling power from an externally generated magnetic field to the second segment of the coil may include coupling to the externally generated magnetic field through a plurality of openings at the side portion of the case.

In some examples, the first and second segments of the coil constitute a first plurality of turns of the coil. The method may further include coupling a second plurality of turns of the coil to the externally generated magnetic field wound about an additional opening formed through the case.

The present disclosure describes an apparatus for wireless power transfer that includes means for housing electronic components of an electronic device and means for coupling to an externally generated magnetic field. The means for coupling may have at least a first segment contained within the means for housing and at least a second segment exposed through an opening formed through the means for housing.

In some examples, the opening may be formed through a side portion of the means for housing.

In some examples, the first segment of the means for coupling may be configured to couple to the externally generated magnetic field through material comprising the means for housing. The second segment may be exposed to the externally generated magnetic field.

In some examples, the means for housing may comprise an upper panel, a middle panel, and a lower panel. The first segment of the means for coupling may be enclosed by the middle panel.

The present disclosure describes a wireless power transfer apparatus that may include a case of an electronic device. The case may have an electrically conductive panel portion. The panel portion may have a central opening and a gap that extends between an exterior surface of the panel portion and the central opening. A coil may be disposed within the central opening of the panel portion and configured to couple to an externally generated magnetic field.

In some examples, the coil may be electrically separate from the panel portion.

In some examples, the coil may be the same material as the panel portion. In some examples, the coil may be a component of the panel portion.

In some examples, the panel portion may include a first panel portion having the central opening and a second panel portion disposed in the central opening. The coil may be disposed in a slot defined between the first panel portion and the second panel portion. In some examples, the second panel portion may be connected to the coil as one end of the coil.

In some examples, the first panel portion and the second panel portion may be electrically connected together.

BRIEF DESCRIPTION OF THE FIGURES

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIGS. 6, 6A, 6B, 6C, and 6D depict illustrative examples of configurations of side portions of a case in accordance with the present disclosure.

FIGS. 7A and 7B illustrate cross sectional views of embodiments of a case in accordance with the present disclosure.

DESCRIPTION

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
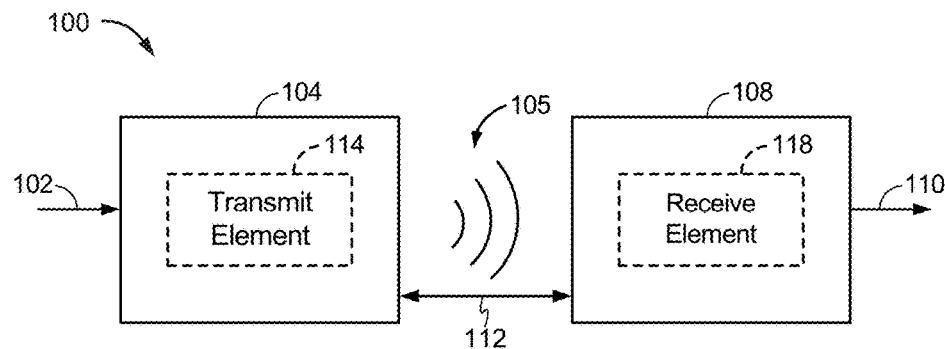
FIG. 1 is a functional block diagram of a wireless power transfer system, in accordance with an illustrative embodiment.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
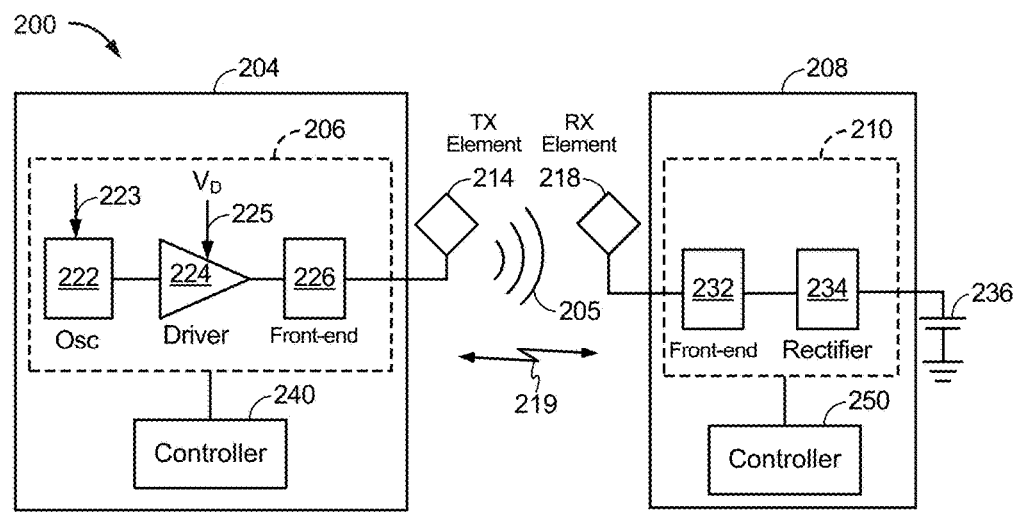
FIG. 2 is a functional block diagram of a wireless power transfer system, in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 configured to control one or aspects of the transmit circuitry 206 or accomplish other operations relevant to managing the transfer of power. The controller 240 may be a micro-controller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
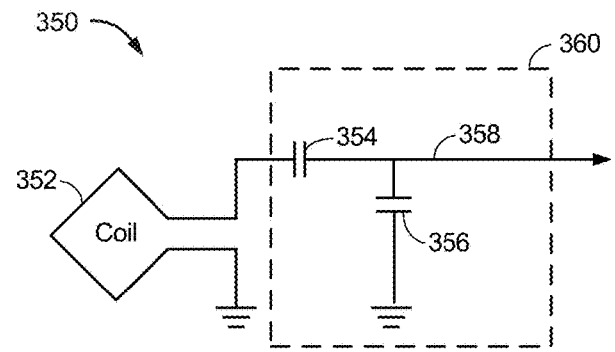
FIG. 3 is a schematic diagram of a portion of transmit circuitry or receive circuitry of FIG. 2 including a transmit or receive element, in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352.

Generally, in accordance with the present disclosure, the power receiving element (e.g., 218, FIG. 2) in a power receiving unit (PRU) of a wireless charging system may comprise one or several resonators (or any power receiver element) distributed throughout the PRU and connected together to produce power. The use of metallic materials for housing electronic devices is a popular design choice. The use of such materials, however, poses a challenge when trying to incorporate wireless charging systems in such electronic devices.

Figure 4:
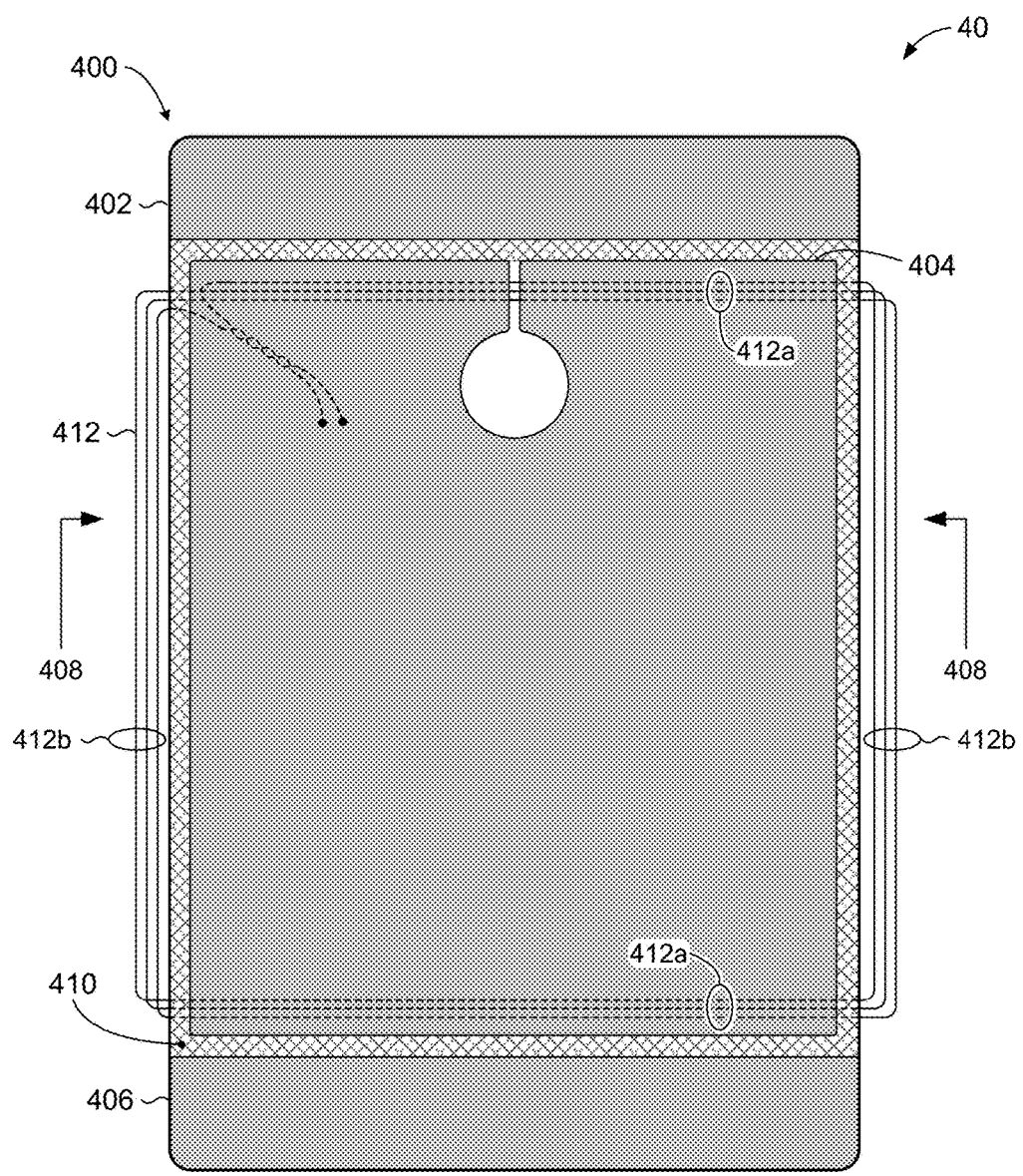
FIG. 4 illustrates a case for an electronic device in accordance with the present disclosure.

FIG. 4 illustrates a case 400 in accordance with some embodiments of the present disclosure. The case 400 may serve as a means for housing electronic components of a device 40 such as a smartphone, a computer tablet, or other electronic device. The case 400 may include an upper panel portion 402, a middle panel portion 404 and a lower panel portion 406. In some embodiments, the panel portions 402, 404, 406 may be metallic, or other electrically conductive material. In other embodiments, one or more of the panels portions 402, 404, 406 may incorporate non-metallic material(s). The case 400 may include side portions 408. In accordance with the present disclosure, the case 400 may have openings formed through the case 400 at the side portions 408. This aspect of the present disclosure will be discussed in more detail below.

The case 400 may include a frame 410 to support one or more of the panel portions 402, 404, 406. The frame 410 may comprise a non-metallic material. The frame 410 may provide a gap between the upper panel portion 402 and the middle panel portion 404 to allow for transmission and reception of radio frequency (RF) signals by the device 40, for example, to provide cellular communications, GPS, Bluetooth, WiFi, and so on (e.g., via a slot antenna formed therefrom). Similarly, the frame 410 may provide a gap between the middle panel portion 404 and the lower panel portion 406 to allow for transmission and reception of RF signals by the device 40. In accordance with the present disclosure, the frame 410 may allow for a gap to be formed between the middle panel portion 404 and the side portions 408 of the case 400. This aspect of the present disclosure will be discussed in more detail below.

The case 400 may include a coil 412. The coil 412 may serve as a means for coupling to an externally generated magnetic field. In some embodiments, the coil 412 may comprise a multi-turn winding of electrically conductive material. The coil 412 depicted in FIG. 4, for example, shows a 3-turn winding. It will be understood that the term "multi-turn" may refer to a coil that is wound with one turn in some embodiments, or a coil that is wound with more than one turn in other embodiments.

In accordance with some embodiments of the present disclosure, the coil 412 may be wound about a periphery of the middle panel portion 404. First segments 412a of coil 412 may be enclosed by the middle panel portion 404. Second segments 412b of coil 412 may be arranged along the side portions 408 of case 400. In accordance with the present disclosure, the second segments 412b may extend beyond the perimeter of the middle panel portion 404.

Figure 4A:
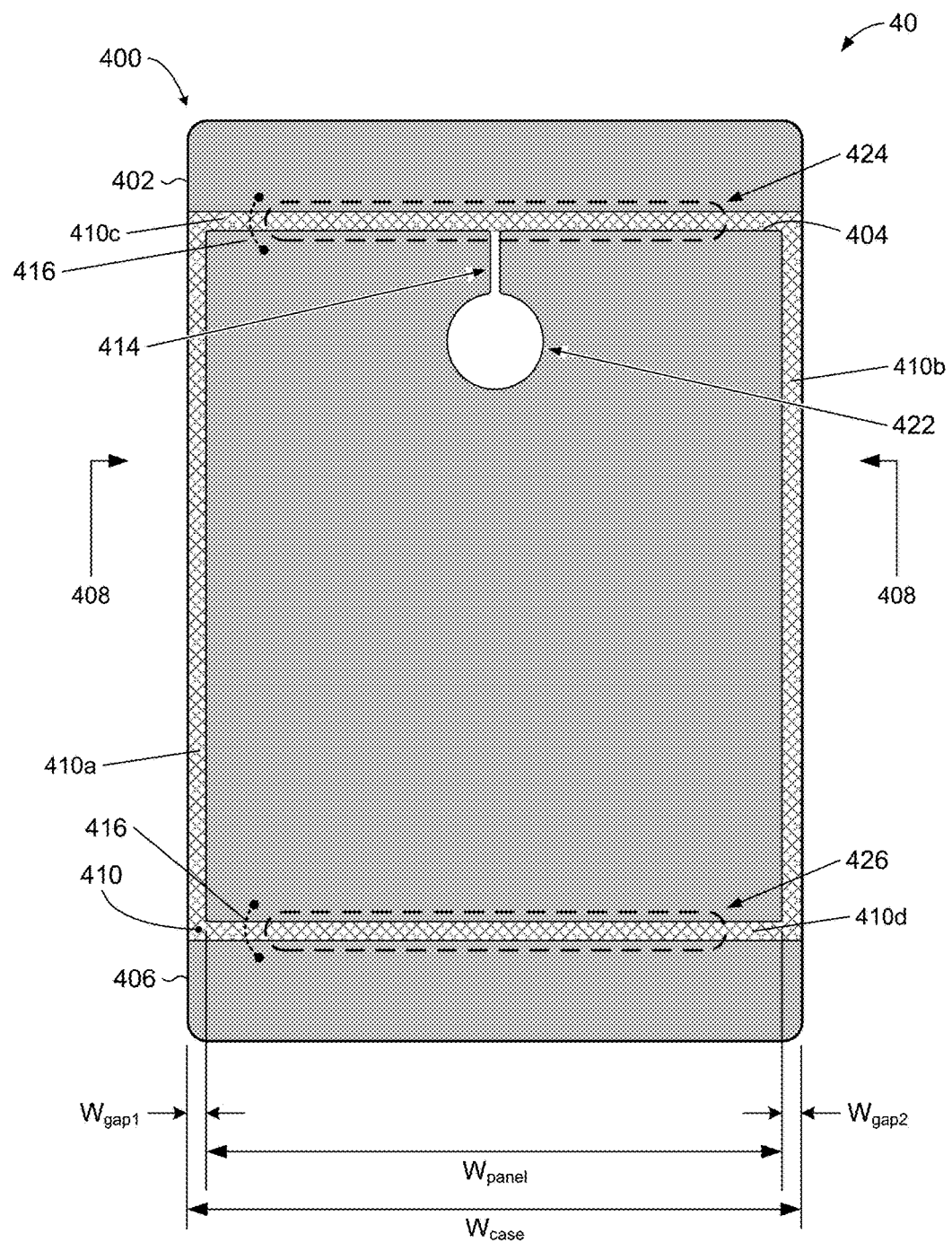
FIG. 4A illustrates details of the case shown in FIG. 4, in accordance with the present disclosure.

FIG. 4A illustrates an aspect of the case 400 in accordance with the present disclosure. In some embodiments, the middle panel portion 404 of the case 400 may be set back from the side portions 408 of the case 400 to define gaps 410a, 410b. For example, the width $W_{panel}$ of the middle panel portion 404 may be less than the width $W_{case}$ of the case 400. The n me non-metallic frame 410 may be configured to support the middle panel portion 404. Gaps 410a, 410b between the middle panel portion 404 and the side portions 408 of the case 400 may have respective gap widths $W_{gap1}$, $W_{gap2}$. The gap widths $W_{gap1}$, $W_{gap2}$ may be the same or they may be different. In a particular embodiment, for example, and only for purposes of illustration, the gap widths $W_{gap1}$, $W_{gap2}$ may be about 2 mm.

In accordance with the present disclosure, the middle panel portion 404 may include a slot 414 formed through the thickness of the material of the middle panel portion 404. The slot 414 may extend from a camera lens opening 422 formed through middle panel portion 404 to an upper edge of the middle panel portion 404. In some embodiments, an antenna may be positioned or formed near the slot 414 for near field communications (NFC).

FIG. 4A further illustrates antenna areas 424, 426, where antennas (not shown) of device 40 may be positioned or formed. As the figure shows, gap 410c between the upper panel portion 402 and the middle panel portion 404 may be aligned with antenna area 424. Similarly, gap 410d between the middle panel portion 404 and the lower panel portion 406 may be aligned with antenna area 426. In some embodiments, where the upper panel portion 402, middle panel portion 404, and lower panel portion 406 are metallic, the gaps 410c, 410d allow for the transmission and reception of electromagnetic (EM) radiation with antennas (not shown) in the antenna areas 424, 426. Since the frame 410 can be a non-metallic material, the frame 410 will not interfere with the EM radiation.

FIG. 4A further illustrates that the electrically separated panel portions 402, 404, 406 may be electrically connected together, for example, using one or more connectors 416. The connectors 416 may be any suitable electrically conductive material, such as wire, metal strip, and so on. In some embodiments, a single connector 416 may connect only the upper panel portion 402 to the middle panel portion 404. In other embodiments, a single connector 416 may connect only the middle panel portion 404 to the lower panel portion 406. In other embodiments, connectors 416 may connect together the upper panel portion 402, the middle panel portion 404, and the lower panel portion 406, such as illustrated in FIG. 4A, for example. The connectors 416 may be made (e.g., by soldering or other suitable attachment) underneath the case 400 on its interior surface. The frame 410 can hide the connector 416 across gaps 410c, 410d, for example, for aesthetic reasons.

Figure 4B:
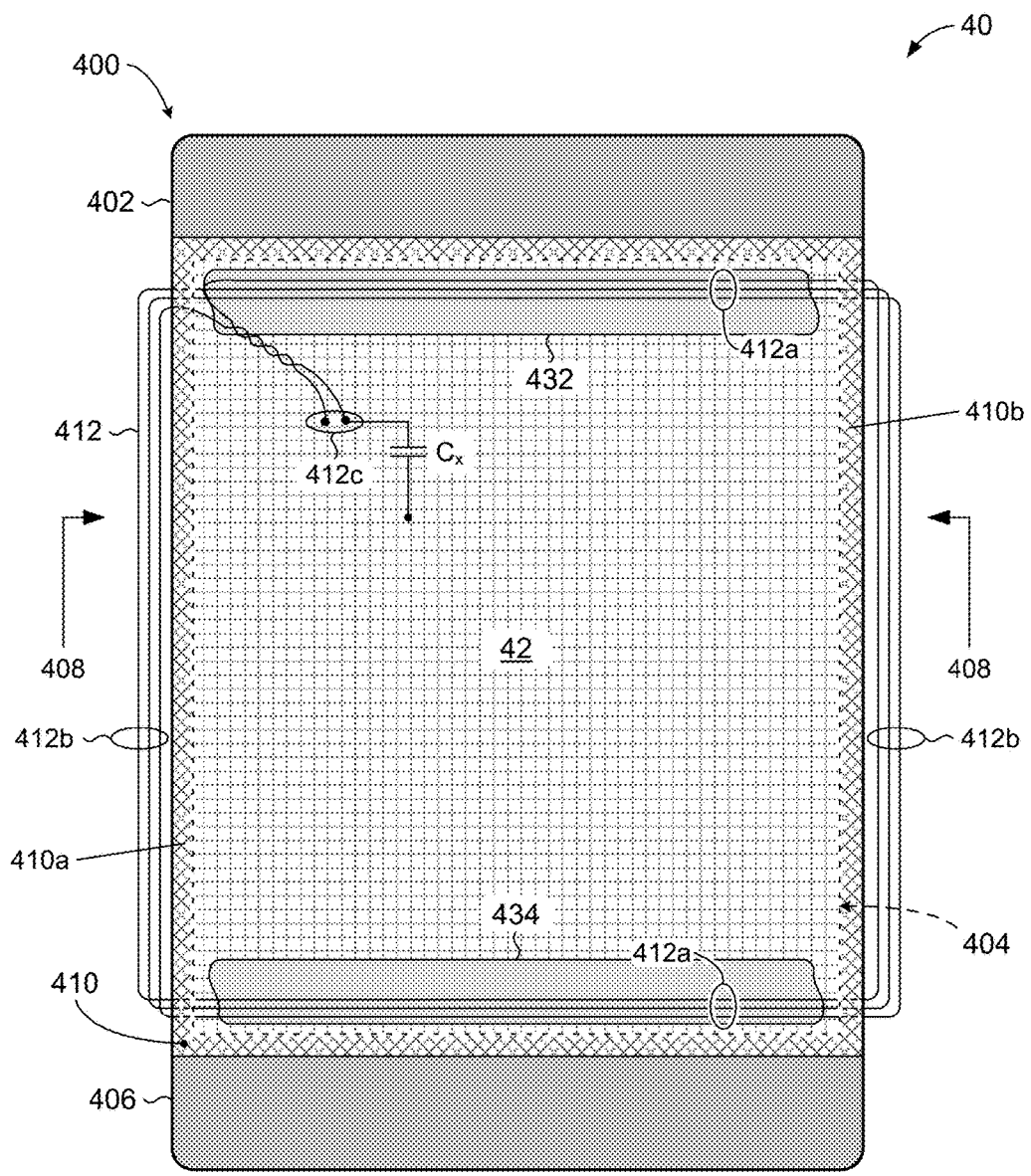
FIG. 4B illustrates details of the coil depicted in FIG. 4, in accordance with the present disclosure.

FIG. 4B shows the case 400 with the middle panel portion 404 removed, exposing portions of the coil 412 beneath the middle panel portion 404. The coil 412 may have terminals 412c for connection to electronic circuitry 42 of the device 40 housed by case 400. In some embodiments, for example, the coil 412 may serve as a wireless power transfer element.

The coil 412 may be configured to couple to an externally generated magnetic field (not shown). Power received (e.g., electric current induced in the coil 412) as a result of coupling to the externally generated magnetic field may be provided to the electronic circuitry 42 through terminals 412c. In some embodiments, the coil 412 may be connected to one or more capacitors $C_x$ (more generally, to any reactive network) to define a resonant circuit to improve coupling to the externally generated magnetic field. For example, the externally generated magnetic field may oscillate at a given oscillation frequency. The resonant circuit may have a resonant frequency equal to the oscillation frequency, which can maximize coupling to the externally generated field.

As mentioned above, in some embodiments, the coil 412 may be wound about a periphery of the middle panel portion 404 (represented by dashed lines) of case 400. In some embodiments, the first segments 412a of coil 412 may be enclosed by the middle panel portion 404. The first segments 412a may span the width of the middle panel portion 404 at upper and lower portions of the middle panel portion 404.

Second segments 412b of coil 412 may be arranged along the side portions 408 of case 400. In some embodiments, the second segments 412b of the coil 412 may extend beyond the perimeter of the middle panel portion 404 and may be exposed through openings formed through the case 400 at the side portions 408. In accordance with the present disclosure, further exposure of the second segments 412b of coil 412 can be provided through gaps 410a, 410b. This aspect of the present disclosure will be discussed in more detail below.

FIG. 4B shows, in some embodiments, ferrite material 432, 434 may be provided between the first segments 412a of coil 412 and electronic circuitry 42 of the device 40 spanned by the first segments 412a. The ferrite material 432, 434 may shield the electronic circuitry 42 from magnetic fields that can arise in the first segments 412a due to current induced in the coil 412 when the coil 412 is exposed to an externally generated magnetic field. Additional ferrite material (not shown) may be provided along second segments 412b of coil 412 to shield the electronic circuitry 42 from similar magnetic fields that can arise when the coil 412 is exposed to an externally generated magnetic field. FIGS. 7A and 7B illustrate examples of the additional ferrite material 732 described in further detail below.

Figure 5:
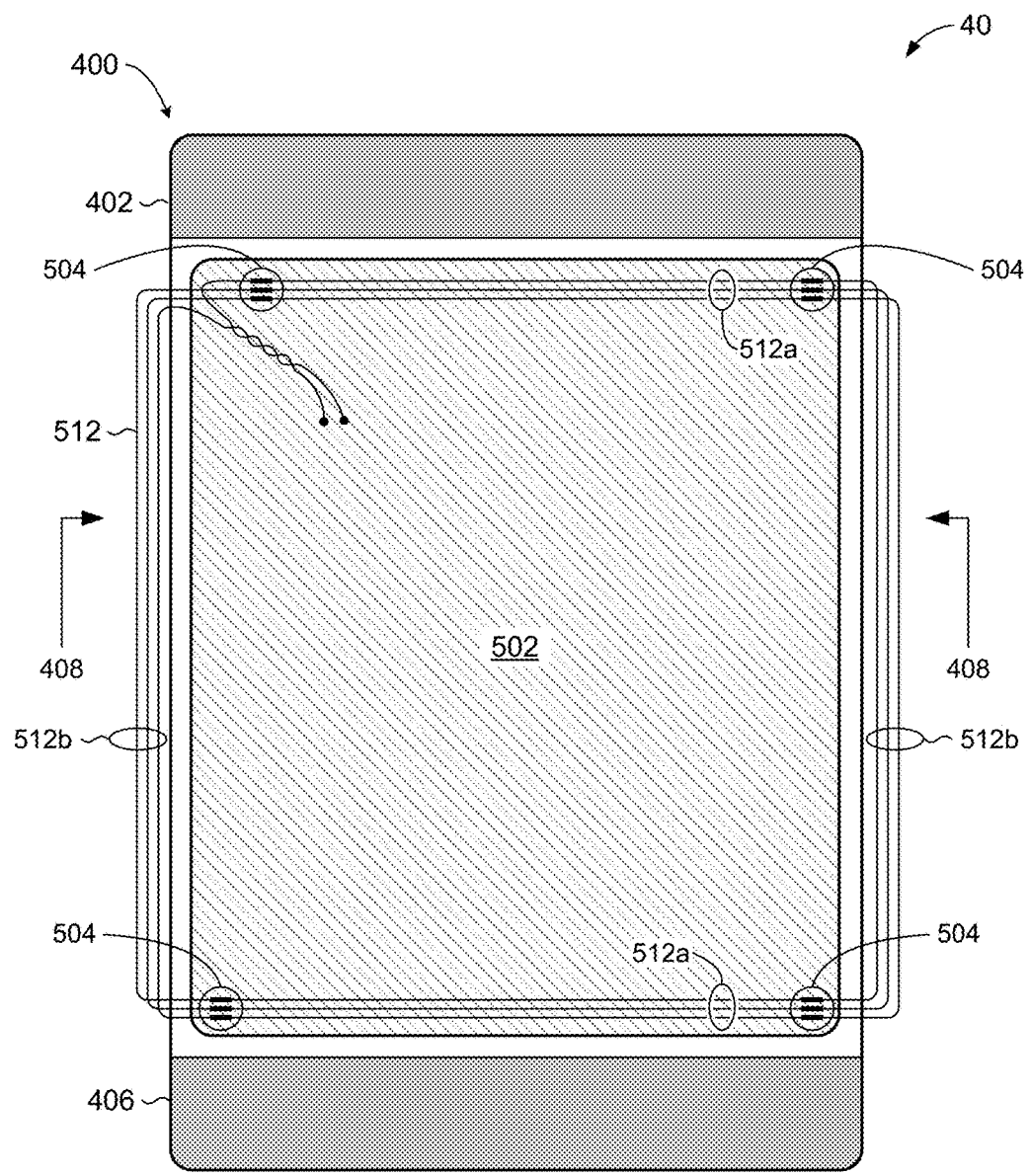
FIG. 5 illustrates an embodiment of a coil in accordance with the present disclosure.

As described above, in some embodiments the coil 412 may be a continuous multi-turn winding of an electrical conductor material. In other embodiments, the coil 412 may be a multi-turn winding comprising separate electrically conductive segments connected together. FIG. 5, for example, shows a device 40 (FIG. 4) comprising coil 512 in accordance with some embodiments of the present disclosure. Elements shown in FIG. 5 that are common to elements shown in FIG. 4 may be identified by the same identifier. The coil 512 may comprise first segments 512a. In some embodiments, for example, the first segments 512a may be electrically conductive traces formed on a printed circuit board (PCB) 502 of the device 40. The coil 512 may comprise second segments 512b that can be connected to the first segments 512a. In some embodiments, the second segments 512b may be pieces of wire or other suitable electrically conductive material. The second segments 512b may be exposed through openings formed through the case 400 at the side portions 408 of the case 400. The PCB 502 may include pads 504, or other suitable connection means, to electrically connect together the first segments 512a and the second segments 512b. The first segments 512a and the second segments 512b may comprise different electrically conductive materials. Nonetheless, the coil 512 may be deemed to constitute a single multi-turn winding.

Referring back to FIG. 4 for a moment, recall that the case 400 may have openings formed through the case 400 at its side portions 408. The side portions may be configured in any of a number of arrangements. Referring now to FIG. 6, for example, a device 60 is depicted in perspective to illustrate a side portion 608 of case 600. The case 600 may include upper panel portion 602, middle panel portion 604, and lower panel portion 606. The middle panel portion 604 includes a cutaway section to reveal a portion of the underlying device electronics 62 (e.g., PCB) of the device 60. The view line A-A will be discussed below in connection with FIG. 7A.

In accordance with the present disclosure, an opening 642 may be formed through the case 600 at side portion 608. For example, a portion of the middle panel portion 604 may be cut back to create opening 642. The coil 612 may include segments 612a that are enclosed by case 600 and a segment 612b that is exposed through the opening 642. In some embodiments, the opening 642 may be covered with a non-metallic (e.g., non-conductive), non-ferromagnetic material or "cap," for example, to protect the interior of the device 60 from external elements such as dust, moisture, etc. The segment 612b of coil 612, nonetheless, remains "exposed" insofar as the non-metallic, non-ferromagnetic cap does not block the segment 612b from being able to couple with an externally generated magnetic field.

As explained above, in accordance with the present disclosure, the middle panel portion 604 may be dimensioned so as to provide a gap (e.g., 410a, FIG. 4) between the sides of the middle panel portion 604 and the side portion 608 of case 600. This gap further exposes the segment 612b of coil 612 to increase the ability to couple to an externally generated magnetic field.

The configuration illustrated in FIG. 6 represents a maximally exposed segment 612b of coil 612. The opening 642 spans the length L of the middle panel portion 604. In some embodiments, the opening 642 may not be completely open. Only for purposes of illustration, FIG. 6A, for example, shows a case 600a for device 60 having a slightly less exposed opening 642a. The opening 642a may be defined by a strip 652 that runs the length of the middle panel portion 604. The strip 652 may comprise a segment of material that is the same material as the middle panel portion 604. The opening 642a still allows a portion of the coil 612 to be exposed to an externally generated magnetic field from the side portion 608 of case 600a. The view line B-B will be discussed below in connection with FIG. 7B.

As another example for purposes of illustration, FIG. 6B shows a case 600b for device 60 having a strip 654 that defines opening 642b. The strip 654 may comprise alternating segments 654a of the material used for the middle panel portion 604 and segments 654b of non-metallic material. In some embodiments, the segments 654b may be plastic, or ferrite, etc. Depending on the material used for segments 654b, the opening 642b may be effectively enlarged to expose more of the coil 612 to an externally generated magnetic field from the side portion 608 of case 600a. For example, if the segments 654b are a plastic material, then an externally generated magnetic field will not be blocked by those segments 654b and can couple more effectively to the coil 612.

As another example for purposes of illustration, FIG. 6C shows a case 600c for device 60 comprising a strip 656 along the side portion 608 that defines segmented openings 642c. The strip 656 may comprise straps 656b that connect a segment 656a to the middle panel portion 604. The straps 656b may define the segmented openings 642c. Portions of the coil 612 can be exposed through the segmented openings 642c.

As another example for purposes of illustration, FIG. 6D shows a case 600d for device 60 comprising a strip 658 along the side portion 608 that defines openings 642d. The strip 658 may comprise alternating segments 658a of the material used for the middle panel portion 604 and segments 658b of non-metallic material. The strip 658 may include straps 658c that connect segments 658a to the middle panel portion 604. The straps 658c may define the segmented openings 642d. Portions of the coil 612 can be exposed through the segmented openings 642d.

One of ordinary skill will appreciate that still other configurations of strips may be realized. The embodiments of strips 652-658 shown respectively in FIGS. 6A-6D illustrate that the designs of strips 652-658 can be driven by aesthetics, while at the same time provide coupling of power between coil 612 and an externally generated magnetic field for wireless power transfer.

FIG. 7A shows a cross sectional view of the device 60 depicted in FIG. 6 taken along view line A-A. In some embodiments, the openings 642 formed through each side of the case 600 may be closed off with caps 708, for example to protect the interior components from external elements. The caps 708 may be of a non-metallic, non-ferromagnetic material; e.g., plastic. FIG. 7A highlights aspects of the present disclosure that can enhance wireless power transfer. In one aspect, the openings 642 formed through each side of the case 600 increase exposure of the segments 612b of the coil 612 to an externally generated magnetic field. The increased exposure can increase the mutual coupling between the coil 612 and an externally generated magnetic field, and hence increase power transfer efficiency.

In another aspect, the middle panel portion 604 may be set back or cut back at its sides to define gaps between the sides of the middle panel portion 604 and the case 600. The gap may expand the openings 642 to further expose the segments 612b of coil 612 to an externally generated magnetic field, and thus can further increase mutual coupling.

In some embodiments, ferrite material 732 (e.g., ferrite tape) may be disposed between the segments 612b of coil 612 and the device electronics 62. The ferrite material 732 can shield the device electronics 62 from magnetic fields that can arise due to induced current in coil 612 during a wireless power transfer operation.

FIG. 7B shows a cross sectional view of the device 60 depicted in FIG. 6A taken along view line B-B. The strip 652 creates a smaller opening 642a formed through each side of the case 600a than in the configuration shown in FIG. 7A. In some embodiments, the opening 642a may be closed off with caps 708a. The caps 708a may be of a non-metallic, non-ferromagnetic material; e.g., plastic. In some embodiments, ferrite material 732 (e.g., ferrite tape) may be disposed between the segments 612b of coil 612 and the device electronics 62 to shield the device electronics 62 from magnetic fields that can arise in segments 612b due to induced current in the coil 612 during a wireless power transfer operation.

Figure 8:
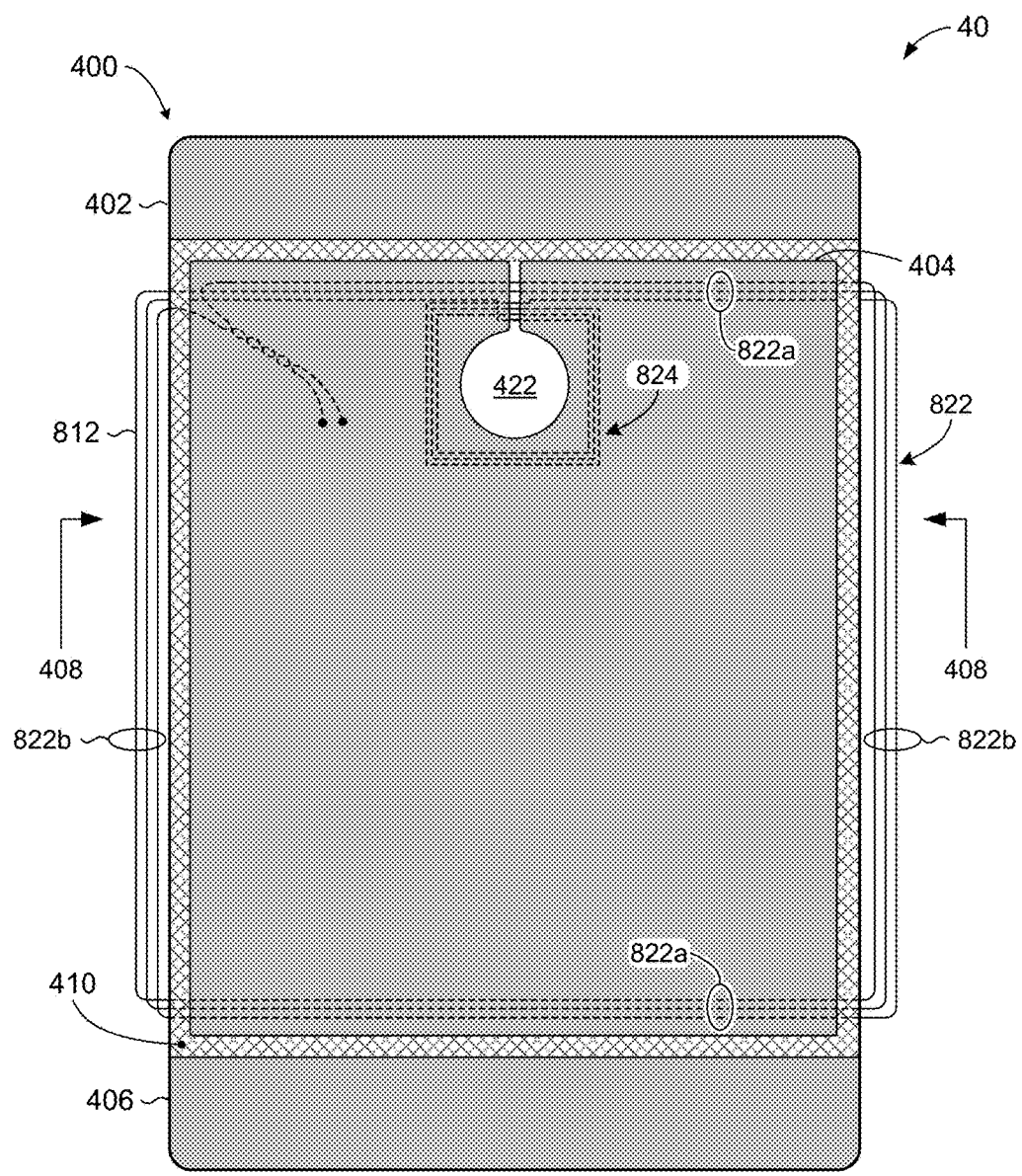
FIG. 8 illustrates an embodiment of a coil having two coil portions.

Referring to FIG. 8, in some embodiments, the turns in a coil may be separated to define a first set of turns and a second set of turns. Elements shown in FIG. 8 that are common to elements shown in FIG. 4 may be identified by the same identifier. FIG. 8 shows a device 40 that may comprise a coil 812 having two multi-turn windings 822, 824 of conductive material. The coil 812 may comprise a first multi-turn winding 822 and a second multi-turn winding 824. The first multi-turn winding 822 may comprise several segments 822a, 822b. The segments 822a, 822b may be arranged so that first segments 822a span the width of the middle panel portion 404 of case 400. Second segments 822b of coil 812 may be exposed through openings formed through the case 400 at the side portions 408 of the case 400.

In some embodiments, the second multi-turn winding 824 may be wound about the camera lens opening 422. The second multi-turn winding 824 may further increase mutual inductance with an externally generated magnetic field (not shown). For example, an externally generated magnetic field may induce eddy currents in the middle panel portion 404. As a consequence of those eddy currents, magnetic fields may arise at the opening 422. The coil 824 may couple to those magnetic fields, thus improving the overall mutual inductance with the externally generated magnetic field.

Figure 9:
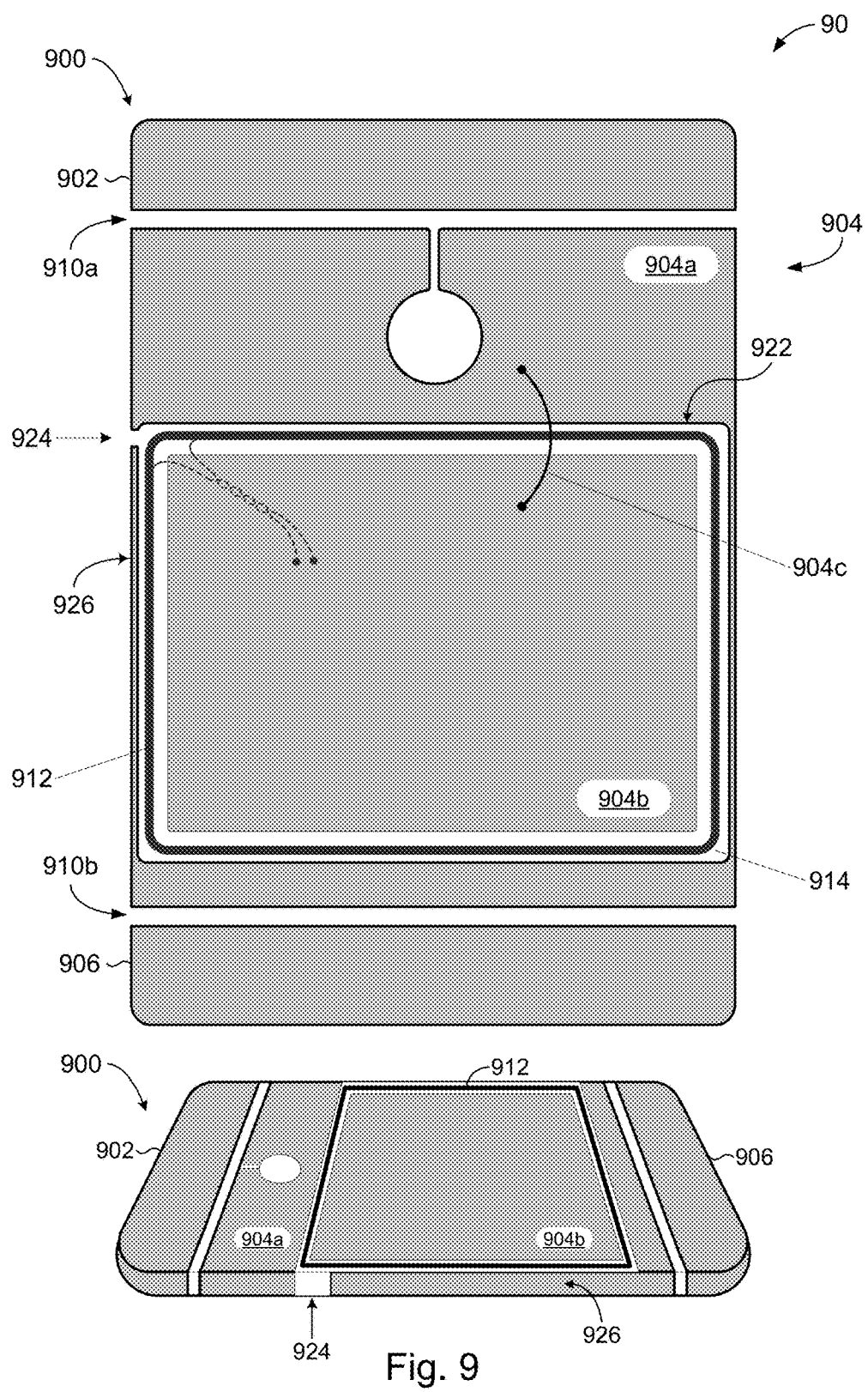
FIGS. 9 and 9A illustrate embodiments of a coil implemented into a metal back cover.

As shown in FIG. 8, in some embodiments the middle panel portion 404 is largely a closed configuration, with the exception of the camera lens opening 422. Referring to FIG. 9, a case 900 in accordance with some embodiments of the present disclosure may be based on the embodiment shown in FIG. 4, but with a middle panel portion 904 that has an open configuration. Case 900 may serve as a means for housing electronic components of a device 90 such as a smartphone, a computer tablet, or other electronic device. The case 900 may include an upper panel portion 902, a middle panel portion 904 and a lower panel portion 906. In some embodiments, the panel portions 902, 904, 906 may be metallic. In other embodiments, one or more of the panels portions 902, 904, 906 may incorporate non-metallic material(s).

The middle panel portion 904 may comprise a first panel portion 904a and a second panel portion (island) 904b. The first panel portion 904a may have a central opening 922 formed through the first panel portion 904a. The second panel portion 904b may be disposed in the central opening 922. The second panel portion 904b may have a smaller perimeter than opening 922 so as to define slot 914 between the first and second panel portions 904a, 904b.

The case 900 may include means for coupling to an externally generated magnetic field, for example a coil 912. In some embodiments, the coil 912 may comprise a multi-turn winding of electrically conductive material. In accordance with some embodiments of the present disclosure, the coil 912 may be wound about a periphery of the second panel portion 904b and disposed in the slot 914. The coil 912 may be electrically separate from both the first panel portion 904a and the second panel portion 904b.

Figure 9A:
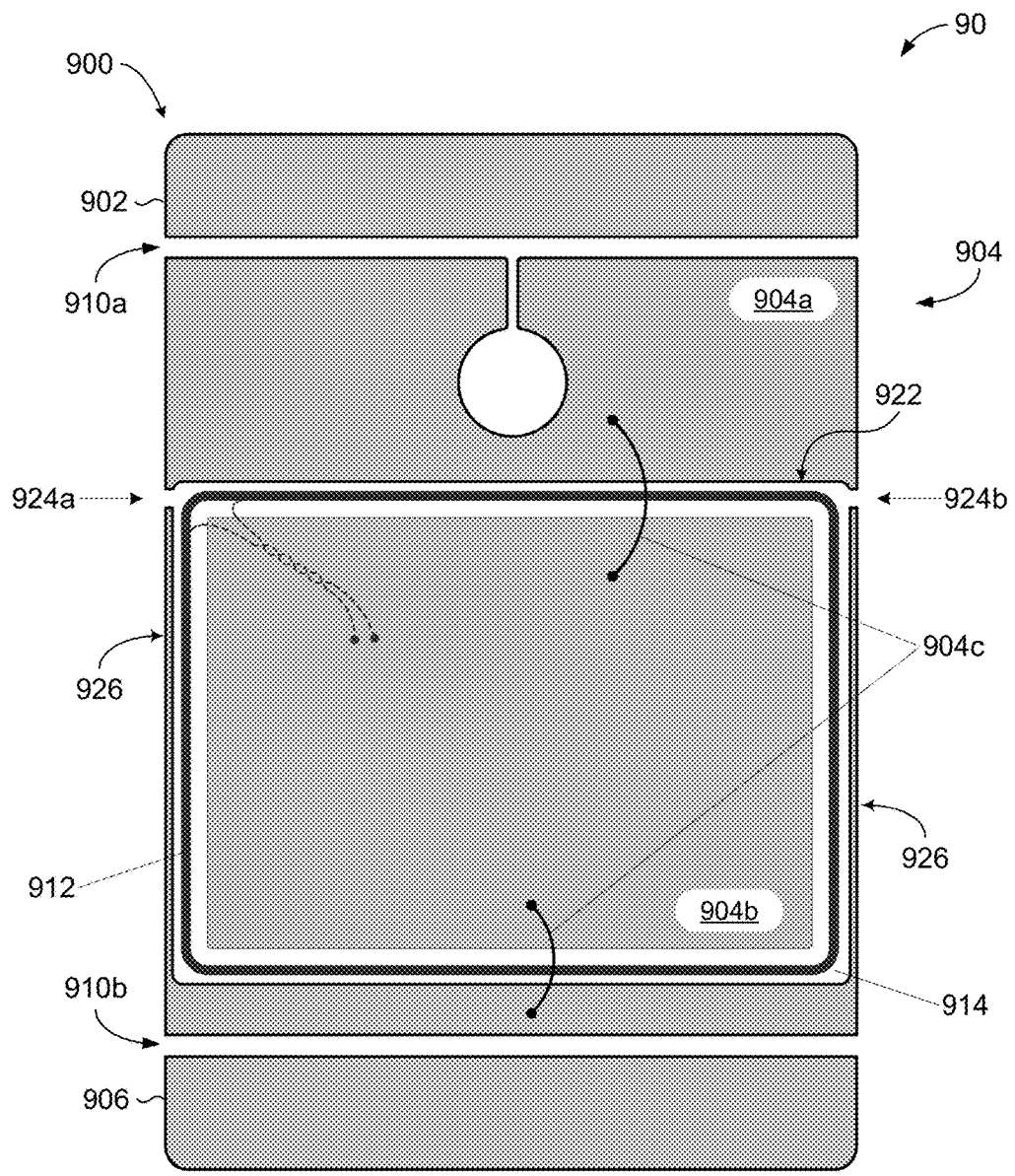

In accordance with the present disclosure, the first panel portion 904a may have a gap 924 that extends between the exterior surface 926 of the first panel portion 904a and the slot 914. The perspective view of case 900 in FIG. 9 illustrates the gap 924 more clearly. The gap 924 may serve as a break to prevent or at least impede the flow of eddy currents about the central opening 922 in the first panel portion 904a. Referring to FIG. 9A, in some embodiments, multiple gaps 924a, 924b may be formed. FIG. 9A, for example, shows gaps 924a, 924b formed between the exterior surface 926 of the first panel portion 904a and slot 914. In other embodiments, additional gaps (not shown) may be formed. The gaps (e.g., 924, FIG. 9 and 924a, 924b, FIG. 9A) may allow for the placement of buttons for the electronic device 90, or for the placement of connectors (e.g., USB, HDMI, etc.).

Returning to FIG. 9, in some embodiments, the second panel portion 904b may be used to establish a reference potential (e.g., ground). For example, the second panel portion 904b may be connected to a ground line on a circuit board (not shown) of the device 90. A jumper wire 904c or other suitable electrical connection may electrically connect together the first panel portion 904a and the second panel portion 904b in order to establish a ground reference in the first panel portion 904a. For example, the electrical connection may be made via a connection to an underlying printed circuit board of the device 90. In some embodiments, for example, communication antennas (not shown) disposed near the gaps 910a, 910b may use the ground reference provided by the first panel portion 904a.

Figure 10:
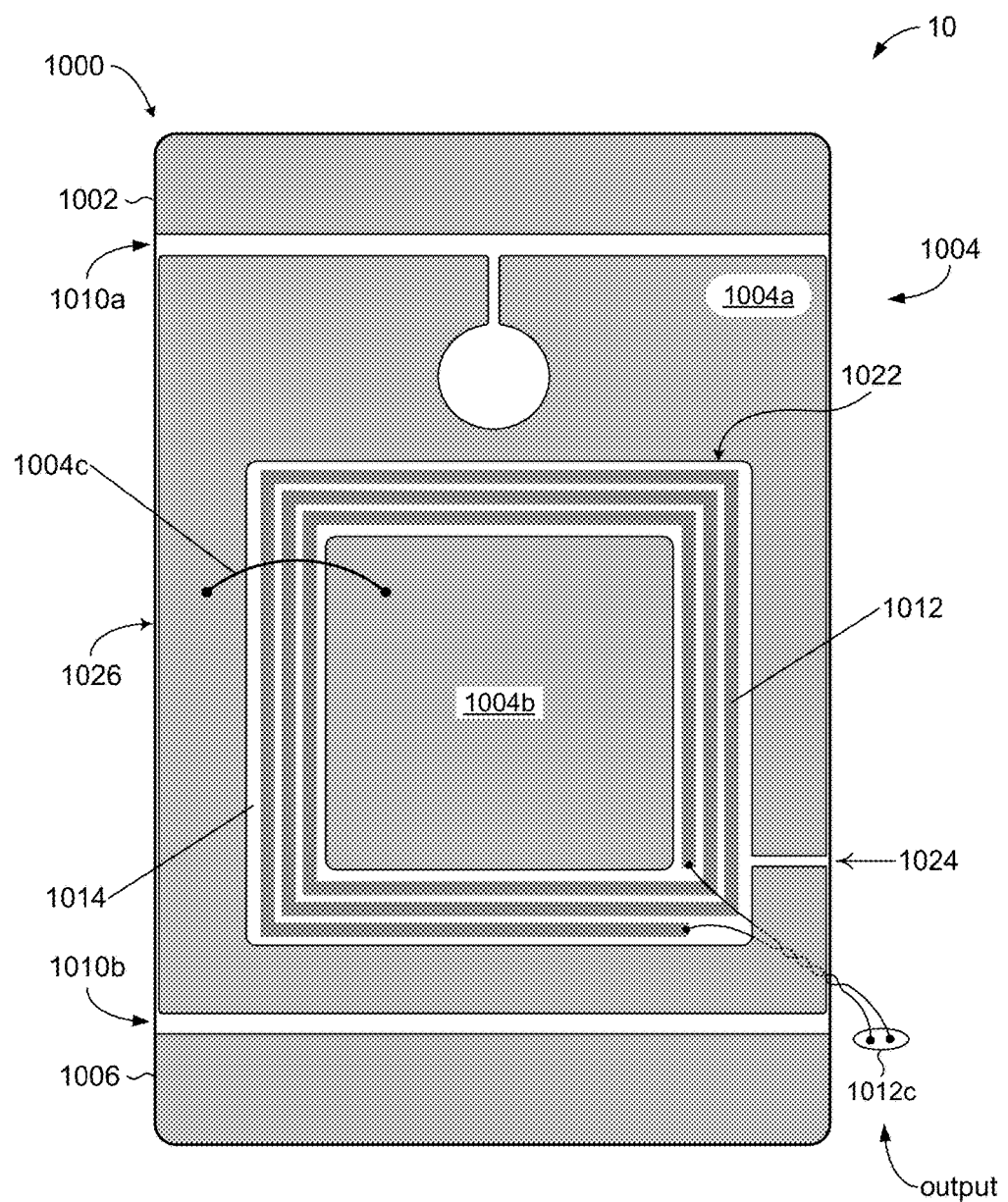
FIGS. 10 and 11 illustrate embodiments of a coil implemented as part of the metal back cover.

FIG. 10 shows another example of a case 1000 in accordance with some embodiments of the present disclosure that may be based on the embodiment shown in FIG. 4, but with a middle panel portion 1004 that has an open configuration. The case 1000 may serve as a means for housing electronic components of a device 10 such as a smartphone, a computer tablet, or other electronic device. The case 1000 may include an upper panel portion 1002, a middle panel portion 1004 and a lower panel portion 1006. In some embodiments, the panel portions 1002, 1004, 1006 may be metallic, or formed from some other electrically conductive material. In other embodiments, one or more of the panels portions 1002, 1004, 1006 may incorporate non-metallic material(s).

The middle panel portion 1004 may comprise a first panel portion 1004a and a second panel portion (island) 1004b. The first panel portion 1004a may have a central opening 1022 formed through the first panel portion 1004a. The second panel portion 1004b may be disposed in the central opening 1022. The second panel portion 1004b may have a smaller perimeter than opening 1022 so as to define slot 1014 between the first and second panel portions 1004a, 1004b.

The case 1000 may include means for coupling to an externally generated magnetic field (not shown), for example a coil 1012. The middle panel portion 1004 may be an electrically conductive material. In some embodiments, the coil 1012 may be formed from the same material as the middle panel portion 1004, which may be desirable in terms of device aesthetics. By comparison, the coil 912 in FIGS. 9 and 9A may be formed from electrically conductive material other than the material used for middle portion 904. In some embodiments, the coil 1012 may serve as part of the middle panel portion 1004 itself, which also may be a design element in terms of aesthetics; for example, to match the color of the other pieces of the case 1000 such as the upper panel portion 1002, first panel portion 1004a, and lower panel portion 1006. Manufacture may be simplified because the manufacturer can simply machine the middle panel portion 1004 to obtain the coil 1012. The metal used for the middle panel portion 1004 may be thicker than the traces on a flexible PCB or a piece of wire. Therefore a coil 1012 fabricated from the middle panel portion 1004 can result in a lower coil resistance, and hence improve efficiency of wireless power transfer.

The coil 1012 may comprise a multi-turn winding of the material. In accordance with some embodiments of the present disclosure, the coil 1012 may be wound about a periphery of the second panel portion 1004b and disposed in the slot 1014. The coil 1012 may be electrically separate from both the first panel portion 1004a and the second panel portion 1004b. The coil 1012 may include terminals 1012c as a means for outputting the power generated in the coil 1012 in response to coupling to the externally generated magnetic field.

In accordance with the present disclosure, a gap 1024 may be formed between the exterior surface 1026 of the first panel portion 1004a and the slot 1014. The gap 1024 may serve as a break to prevent or at least impede the flow of eddy currents about the central opening 1022. In some embodiments, the gap 1024 may be formed near some part of the coil 1012 to enhance coupling the coil 1012 to an externally generated magnetic field.

In some embodiments, the second panel portion 1004b may be used to establish a reference potential (e.g., ground). For example, the second panel portion 1004b may be connected to a ground line on a circuit board (not shown) of the device 10. A jumper wire 1004c or other suitable electrical connection may connect together the first panel portion 1004a and the second panel portion 1004b in order to establish a ground reference in the first panel portion 1004a as well. Communication antennas (e.g., WWAN, WiFi, GPS, not shown) disposed near the gaps 1010a, 1010b may use the first panel portion 1004a as a ground reference.

Figure 11:
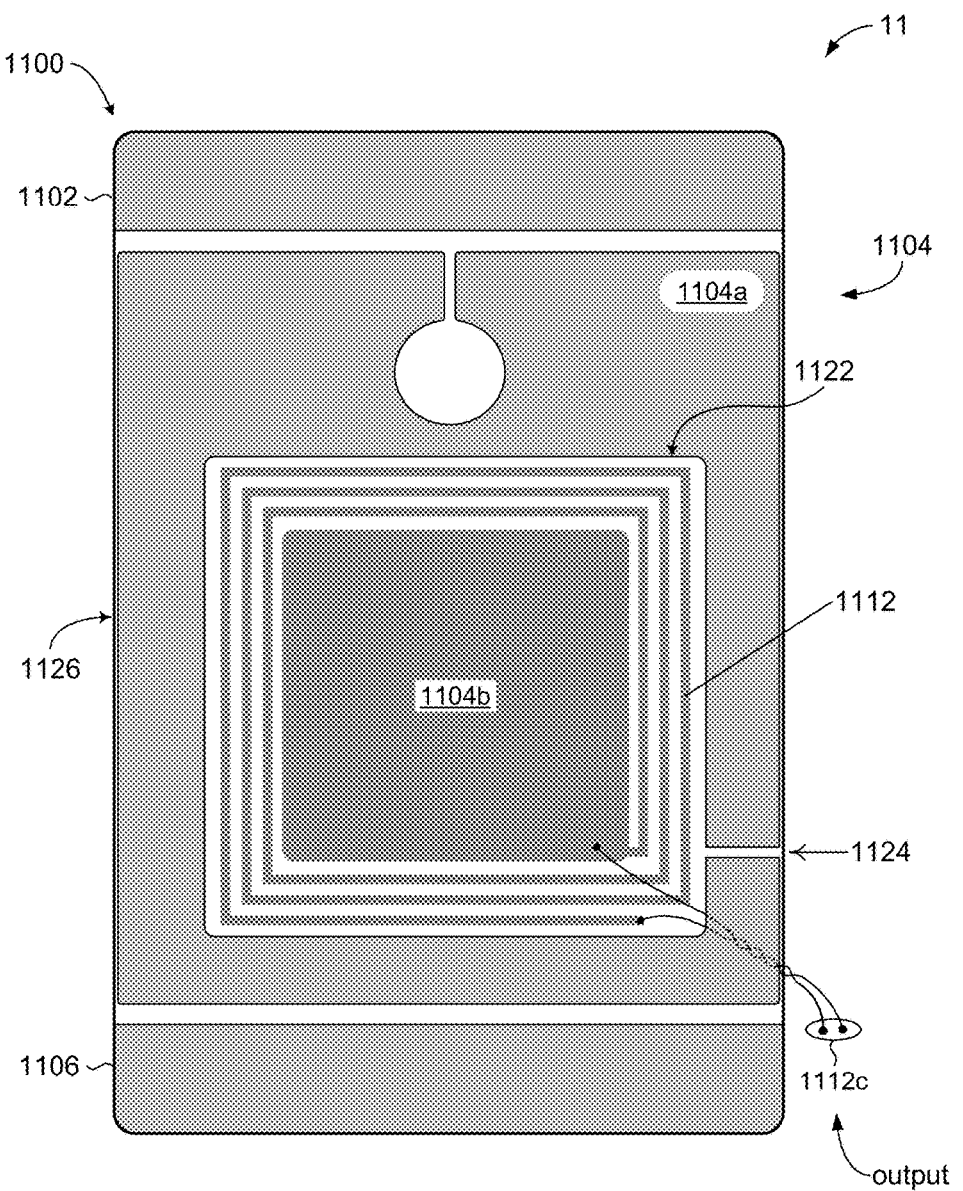

FIG. 11 shows another example of a case 1100 in accordance with some embodiments of the present disclosure that may be based on the embodiment shown in FIG. 4, but with a middle panel portion 1104 that has an open configuration. The case 1100 may serve as a means for housing electronic components of a device 11 such as a smartphone, a computer tablet, or other electronic device. The case 1100 may include an upper panel portion 1102, a middle panel portion 1104 and a lower panel portion 1106. In some embodiments, the panel portions 1102, 1104, 1106 may be metallic, or other electrically conductive material. In other embodiments, one or more of the panels portions 1102, 1104, 1106 may incorporate non-metallic material(s).

The middle panel portion 1104 may comprise a first panel portion 1104a and a second panel portion (island) 1104b. The first panel portion 1104a may have a central opening 1122 formed through the first panel portion 1104a. The second panel portion 1104b may be disposed in the central opening 1122.

The case 1100 may include means for coupling to an externally generated magnetic field (not shown), for example a coil 1112. In some embodiments, the middle panel portion 1004 may be an electrically conductive material, and the coil 1112 may be formed from the same material as the middle panel portion 1104. In some embodiments, the coil 1112 may serve as part of the middle panel portion 1104 itself. The coil 1112 may comprise a multi-turn winding of the material. In accordance with some embodiments of the present disclosure, the coil 1112 may be wound about a periphery of the second panel portion 1104b and electrically connected to the second panel portion 1104b. The second panel portion 1104b may serve as one end of the coil 1112. Terminals 1112c may be connected to coil 1112 to provide output for power generated in the coil 1112 in response to coupling to the externally generated magnetic field.

In some embodiments, the second panel portion 1104b may be electrically connected to ground potential to serve as a common ground plane for electronic components (not shown) comprising the electronic device 11. A common ground plane can improve electrical stability, for example, by reducing the potential for noise. In other embodiments, the second panel portion 1104b may serve as a heat sink. This may be important if the coil 1112 heats up during wireless power transfer.

In accordance with the present disclosure, a gap 1124 may be formed between the exterior surface 1126 of the first panel portion 1104a and the central opening 1122. The gap 1124 may serve as a break to prevent or at least impede the flow of eddy currents about the central opening 1122 in the first panel portion 1104a. In some embodiments, the gap 1124 may be formed near some part of the coil 1112 to enhance coupling the coil 1112 to an externally generated magnetic field.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A wireless power transfer apparatus comprising:
   a case configured to house electronic components of an electronic device, the case having an electrically conductive panel portion and side portions along sides of the panel portion, the case defining a non-electrically-conductive portion through at least one of the side portions; and
   a coil configured to couple to an externally generated magnetic field, the coil including a plurality of loops each having first segments that span a width of the panel portion of the case and second segments arranged along the side portions of the case and adjacent the non-electrically-conductive portion, the second segments of each of the plurality of loops being displaced a different distance from the panel portion than the first segments of the respective loop;
   wherein the panel portion of the case is metallic.

2. The apparatus of claim 1, wherein the coil is electrically separate from the panel portion.

3. The apparatus of claim 1, wherein the panel portion defines a central opening therethrough, wherein the coil is disposed in and along a perimeter of the central opening.

4. The apparatus of claim 1, wherein the non-electrically-conductive portion comprises at least one opening defined by the at least one of the side portions.

5. The apparatus of claim 4, wherein the second segments of the coil are magnetically exposed through the at least one opening.

6. The apparatus of claim 1, wherein the case further comprises an upper panel portion and a lower panel portion.

7. The apparatus of claim 1, wherein the panel portion defines a slot therethrough that extends from an interior of the panel portion to a periphery of the panel portion.

8. The apparatus of claim 1, wherein the first segments of the coil are enclosed by the panel portion of the case.

9. The apparatus of claim 1, wherein the first segments of the coil are disposed on a printed circuit board (PCB) housed within the case.

10. The apparatus of claim 1, wherein the non-electrically-conductive portion spans a length of the panel portion of the case.

11. The apparatus of claim 4, wherein the side portions of the case comprise one or more strips of material that comprises the case, the one or more strips of material disposed parallel to the at least one opening.

12. The apparatus of claim 1, wherein the coil comprises a single multi-turn winding of electrically conductive material.

13. The apparatus of claim 1, wherein the coil comprises a single multi-turn winding of electrically conductive material having a first plurality of turns wound about a circumference of the panel portion of the case and a second plurality of turns wound within the periphery of the panel portion.

14. The apparatus of claim 1, wherein the coil is connected to a reactive network defining a resonant circuit configured to facilitate coupling to the externally generated magnetic field.

15. The apparatus of claim 1, wherein the plurality of loops includes at least a first loop and a second loop, the second segment of the first loop being displaced further from the electrically-conductive middle panel than the second segment of the second loop.

16. The apparatus of claim 15, wherein the first segment of each of the plurality of loops is disposed in a first plane, the second segment of each of the plurality of loops is disposed in a second plane, and the second plane is perpendicular to the first plane.

17. A method for wireless power transfer to electronic components of an electronic device comprising:
   coupling a first segment of each of a plurality of turns of a multi-turn coil to an externally generated magnetic field through a case that houses the electronic components, the first segments each spanning a width of a metallic panel portion of the case;
   coupling a second segment of each of the plurality of turns of the multi-turn coil to the externally generated magnetic field through a non-electrically-conductive portion of a side portion of the case over a distance from the second segment of a first turn of the plurality of turns to the second segment of a second turn of the plurality of turns;
   generating power in response to coupling to the externally generated magnetic field; and
   providing the generated power to the electronic components.

18. The method of claim 17, wherein coupling the second segment of each of the plurality of turns of the multi-turn coil to the externally generated magnetic field includes coupling to the externally generated magnetic field through a cap that covers the non-electrically-conductive portion of the case.

19. The method of claim 18, wherein the cap is a non-metallic and non-ferromagnetic material.

20. The method of claim 17, wherein coupling the second segment of each of the plurality of turns of the multi-turn coil to the externally generated magnetic field includes coupling to the externally generated magnetic field through a plurality of non-electrically-conductive portions through the side portion of the case.

21. The method of claim 17, wherein the first and second segments of the multi-turn coil constitute a first plurality of turns of the multi-turn coil, the method further comprising coupling a second plurality of turns of the multi-turn coil to the externally generated magnetic field wound about an additional opening formed through the case.

22. An apparatus for wireless power transfer comprising:
   means for housing electronic components of an electronic device and comprising an electrically-conductive middle panel; and
   means for coupling to an externally generated magnetic field, the means for coupling including a coil having a plurality of loops with each loop having at least a first segment contained within the means for housing adjacent the electrically-conductive middle panel, spanning a width of the electrically-conductive middle panel, and at least a second segment displaced a different distance from the electrically-conductive middle panel than the first segment and disposed adjacent a non-electrically-conductive portion extending through a side of the means for housing.

23. The apparatus of claim 22, wherein the non-electrically-conductive portion is an opening defined by the side of the means for housing.

24. The apparatus of claim 22, wherein the first segment of the means for coupling is configured to couple to the externally generated magnetic field through material comprising the means for housing, wherein the second segment is exposed to the externally generated magnetic field.

25. The apparatus of claim 22, wherein the means for housing comprises an upper panel, a middle panel, and a lower panel, wherein the first segment of the means for coupling is enclosed by the middle panel.

26. The apparatus of claim 22, wherein the plurality of loops includes at least a first loop and a second loop, the second segment of the first loop being displaced further from the electrically-conductive middle panel than the second segment of the second loop.

27. The apparatus of claim 26, wherein the first segment of each of the plurality of loops is disposed in a first plane, the second segment of each of the plurality of loops is disposed in a second plane, and the second plane is perpendicular to the first plane.

28. A wireless power transfer apparatus comprising:
a case configured to house electronic components of an electronic device, the case having an electrically conductive panel portion, the panel portion defining a central opening therethrough, the panel portion further defining a gap that extends between an exterior side surface of the panel portion and the central opening through the panel portion; and
a coil disposed within and along a perimeter of the central opening defined by the panel portion and configured to couple to an externally generated magnetic field.

29. The apparatus of claim 28, wherein the coil is electrically separate from the panel portion.

30. The apparatus of claim 28, wherein the coil comprises the same material as the panel portion.

31. The apparatus of claim 30, wherein the coil is a component of the panel portion.

* * * * *